United States Patent
Gu et al.

(10) Patent No.: US 9,014,878 B2
(45) Date of Patent: Apr. 21, 2015

(54) METHOD FOR DETECTING PERFORMANCE OF AN AIRCRAFT BASED ON A CUSTOMIZED MESSAGE

(75) Inventors: Zhuping Gu, Zhejiang Province (CN); Jiaju Wu, Zhejiang Province (CN); Fengliang Zheng, Zhejiang Province (CN); Lei Huang, Zhejiang Province (CN); Minjie Tang, Zhejiang Province (CN)

(73) Assignee: Air China Limited, Beijing (CN)

( * ) Notice: Subject to any disclaimer, the term of this patent is extended or adjusted under 35 U.S.C. 154(b) by 145 days.

(21) Appl. No.: 13/559,200

(22) Filed: Jul. 26, 2012

(65) Prior Publication Data

US 2013/0197721 A1    Aug. 1, 2013

(30) Foreign Application Priority Data

Jul. 27, 2011    (CN) .......................... 2011 1 0212037

(51) Int. Cl.
*B64D 45/00*    (2006.01)
*G06Q 10/00*    (2012.01)

(52) U.S. Cl.
CPC ................ *B64D 45/00* (2013.01); *G06Q 10/00* (2013.01)

(58) Field of Classification Search
CPC ...... G06Q 10/00; G06Q 10/08; G06Q 10/109; B64D 45/00; G06F 19/00; G06F 15/16
USPC ............... 701/3, 31.5, 33.4, 29.6, 14, 9, 34.2, 701/34.3, 31.6, 31.9
See application file for complete search history.

(56) References Cited

U.S. PATENT DOCUMENTS

| | | | |
|---|---|---|---|
| 7,636,568 B2 * | 12/2009 | Gould et al. | 455/431 |
| 7,822,415 B2 * | 10/2010 | Meyers et al. | 455/431 |
| 8,200,376 B2 * | 6/2012 | Mattingly et al. | 701/3 |
| 8,255,112 B2 * | 8/2012 | Conzachi et al. | 701/31.5 |
| 2007/0115938 A1 * | 5/2007 | Conzachi et al. | 370/352 |
| 2009/0037034 A1 * | 2/2009 | Mattingly et al. | 701/3 |

* cited by examiner

*Primary Examiner* — Richard Camby
(74) *Attorney, Agent, or Firm* — Nath, Goldberg & Meyer; Jerald L. Meyer

(57) ABSTRACT

The present invention relates to a method for detecting the performance of the aircraft comprising: collecting data reflecting operation status of the aircraft; generating the customized message based on the collected data, wherein, the customized message is configured to include one or more main parameters related to the operation status of the aircraft; storing or transmitting the customized message; and detecting the performance of the aircraft based on the customized message.

15 Claims, 12 Drawing Sheets

CREW OXYGEN REPORT <230>

| | A/C ID | DATE UTC | FROM | TO | FLT | |
|---|---|---|---|---|---|---|
| | Aircraft ID | UTC Time | Take Off | Landing | Flight No. | |
| CC | BXXXX | yyyy-dd-mm xx:xx:xx | - | - | - | |
| | PH | CNT | CODE | BLEEDSTATUS | APU | |
| | Phase | Count | Trigger Code | | APU Bleed Air Valve | |
| CI | 11 | 00870 | 1000 | 36 0000 1 0000 33 | 1 | |
| | TAT | ALT | CAS | MN | GW | CG | DMU |
| | Total Temperature | Altitude | Calculated Speed | Mach Number | Gross Weight | Center of Gravity | Version |
| CE | 24.5 | -9 | --- | --- | --- | --- | I21CA2 |
| | ESN | EHRS | AP | PLAP | SLAT | | |

30S INTERVAL PER ENGINE START

| | CKPT_T | SAT | PRES | | DATE UTC |
|---|---|---|---|---|---|
| | Cockpit Temperature | static temperature | Oxygen Pressure | | Sampling Time |
| S1 | 26.7 | 24.8 | 1958 | --- | 04:02:31 |
| S2 | 26.5 | 24.5 | 1958 | --- | 04:03:01 |
| S3 | 26.5 | 24.5 | 1958 | --- | 04:03:31 |

30S INTERVAL ENGINE SHUT (POST 60 MIN OR MES)

| S4 | 27 | 26.7 | 1935 | --- | 07:23:38 |
|---|---|---|---|---|---|
| S5 | 26.9 | 26.3 | 1934 | --- | 07:24:08 |
| S6 | 27 | 26.7 | 1935 | --- | 07:24:38 |

AT EVENT ENGINE SHUT DOWN

| S7 | 24.2 | 25 | 1888 | --- | 06:23:38 |
|---|---|---|---|---|---|

Fig.4

LOAD REPORT <530>

| | A/C ID | DATE UTC | | FROM | TO | FLT | |
|---|---|---|---|---|---|---|---|
| | Aircraft No. | UTC Time | | Taking off | Landing | Flight No. | |
| CC | BXXXX | yyyy-dd-mm xx:xx:xx | | - | - | - | |
| | PH | CNT | CODE | BLEEDSTATUS | | APU | |
| | Flight phase | Count | Trigger code | | | APU Bleed Air valve | |
| C1 | 07 | 490 | 4101 | 56 0011 0 1100 56 | | X | |
| | TAT | ALT | CAS | MN | GW | CG | DMU |
| | Total air temperature | Altitude | Calculate Air Speed | Mach Speed | Gross Weight | Gravity Center | Version |
| CE | 0215 | 00073 | 121 | 184 | 5459 | 30.9 | 171CA1 |
| | ESN | EHRS | AP | FLAP | SLAT | | |
| | Engin No. | Engine Hour | Automatic Piloting | | | | |
| EC | - | 00855 | 06 | 3900 | 2700 | | |
| EE | - | 00855 | 06 | 3900 | 2699 | | |
| | MIT EXCEEDANCE AND SPOILER EXT SUMMARY | | | | | | |
| | MAX | LIM | | COUNTS | | | |
| N1 | S~.Z | S~.Z | | | | | |
| E1 | -015 | -005 | 000 | 000 | 000 | 000 | |
| | REASON: | CUSTOMER | | | | | |
| | VALUES AT 1 SEC BEFORE LAND/EVENT | | | | | | |
| | RALT | RALR | PTCH | PTCR | ROLL | ROLR | YAW |
| N2 | SZZZ | S~.Z | S~.Z | S~.Z | S~.Z | S~.Z | S~.Z |
| S1 | 0002 | -044 | 0048 | -001 | -012 | 0000 | -005 |
| | VALUES AT LAND/EVENT | | | | | | |
| S2 | -00 | -018 | 0047 | -015 | 0000 | -040 | -002 |
| | MAX/MIN 1 SEC TO 3 SEC INTERVAL | | | | | | |
| | VRTA | LONA | LATA | | | | |
| | Vertical load | Longitudinal load | Lateral load | | | | |
| N3 | SZ.ZZ | SZ.ZZ | SZ.ZZ | | | | |
| S3 | 0164 | 0011 | 0021 | | | | |
| S4 | 0061 | -010 | -007 | | | | |

Fig.14

LOAD REPORT <530>

|    | A/C ID | DATE UTC | FROM | TO | FLT |  |
|----|--------|----------|------|-----|-----|--|
|    | Aircraft No. | UTC Time | Taking off | Landing | Flight No. |  |
| CC | BXXXX | yyyy-dd-mm xx:xx:xx | - | - | - |  |
|    | PH | CNT | CODE | BLEEDSTATUS | APU |  |
|    | Flight phase | Count | Trigger code |  | APU Bleed Air valve |  |
| C1 | 07 | 490 | 4101 | 56 0011 0 1100 56 | X |  |
|    | TAT | ALT | CAS | MN | GW | CG | DMU |
|    | Total air temperature | Altitude | Calculate Air Speed | Mach Speed | Gross Weight | Gravity Center | Version |
| CE | 0215 | 00073 | 121 | 184 | 5459 | 30.9 | I71CA1 |
|    | ESN | EHRS | AP | FLAP | SLAT |  |  |
|    | Engin No. | Engine Hour | Automatic Piloting |  |  |  |  |
| EC | - | 00855 | 06 | 3900 | 2700 |  |  |
| EE | - | 00855 | 06 | 3900 | 2699 |  |  |

MIT EXCEEDANCE AND SPOILER EXT SUMMARY

|    | MAX | LIM |  | COUNTS |  |  |  |
|----|-----|-----|--|--------|--|--|--|
| E1 | 2.65 | 2.6 | 000 | 000 | 000 | 000 |  |
|    | REASON: | VRTA |  |  |  |  |  |

VALUES AT 1 SEC BEFORE LAND/EVENT

|    | RALT | RALR | PTCH | PTCR | ROLL | ROLR | YAW |
|----|------|------|------|------|------|------|-----|
| S1 | 0002 | -110 | 0048 | -001 | -012 | 0000 | -005 |

VALUES AT LAND/EVENT

|    | RALT | RALR | PTCH | PTCR | ROLL | ROLR | YAW |
|----|------|------|------|------|------|------|-----|
| S2 | -00 | -072 | 0047 | -015 | 0000 | -040 | -002 |

MAX/MIN 1 SEC TO 3 SEC INTERVAL

|    | VRTA | LONA | LATA |
|----|------|------|------|
|    | Vertical load | Longitudinal load | Lateral load |
| S3 | 0207 | 0031 | 0042 |
| S4 | 0089 | -011 | -009 |

VALUES AT 1 SEC BEFORE BOUNCED

|    | RALT | RALR | PTCH | PTCR | ROLL | ROLR | YAW |
|----|------|------|------|------|------|------|-----|
| T1 | 0002 | 042 | 0047 | -001 | -011 | 0000 | -005 |

VALUES AT BOUNCED

|    | RALT | RALR | PTCH | PTCR | ROLL | ROLR | YAW |
|----|------|------|------|------|------|------|-----|
| T2 | -00 | -015 | 0047 | -015 | 0000 | -040 | -002 |

MAX/MIN 1 SEC TO 3 SEC INTERVAL

|    | VRTA | LONA | LATA |
|----|------|------|------|
| T3 | 0265 | 0010 | 0010 |
| T4 | 0060 | -010 | -007 |

Fig.15

METHOD FOR DETECTING PERFORMANCE OF AN AIRCRAFT BASED ON A CUSTOMIZED MESSAGE

TECHNICAL FIELD OF THE INVENTION

The present invention relates to a method for detecting the performance of the aircraft, in particular to a method for detecting the performance of the aircraft based on the customized message.

BACKGROUND

Aircraft is an important vehicle. A lots of passengers travel by aircraft everyday. Therefore, the safety of flight must be ensured. When a component of the aircraft fails, the aircraft must be grounded and maintained until problems are resolved. Thus, it is possible that the aircraft is delayed even grounded once a component of the aircraft fails.

At present, maintenance of the aircraft mainly is post-processing or performed on a fixed schedule. As mentioned above, utilizing post-processing, it is hard to avoid delay and grounding of the aircraft, since maintenance of some parts of the aircraft is a time-consuming process. Sometimes, there are no spare parts in the airport for replacing due to high price or using up thereof, which will directly cause grounding of the aircraft. Maintaining on schedule means a certain component of the aircraft is maintained or replaced after a fixed time, which can avoid delay or grounding of the aircraft to some extent, however, its cost is too high. In particular for some expensive parts, their performance may be normal when they are replaced, which is extensive waste. However, under certain circumstances, some special parts might deteriorate soon. In this case, maintenance according to a fixed schedule cannot completely avoid the delay or grounding of aircraft.

SUMMARY

For one or more technical problem of the conventional technology, one aspect of the invention provides a method detecting the performance of the aircraft comprising: collecting data reflecting operation status of the aircraft; generating the customized message based on the collected data, wherein, the customized message is configured to include one or more main parameters related to the operation status of the aircraft; storing or transmitting the customized message; and detecting the performance of the aircraft based on the customized message.

According to another aspect of the invention there is provided a method for maintaining an aircraft comprising: detecting the performance of the aircraft using the method mentioned above; and maintaining the aircraft in response to a failure of the aircraft; or arranging the aircraft to be maintained in an appropriate time in response to that the aircraft is in a recession period.

BRIEF DESCRIPTION OF THE DRAWINGS

Hereinafter, some preferred embodiments of the invention will be described in reference to the accompanying drawings.

FIG. 4 is a schematic illustrating an example of a customized message according to one embodiment of the present invention.

FIG. 14 is a schematic illustrating an example of a customized short landing message according to one embodiment of the present invention.

FIG. 15 is a schematic illustrating an example of a customized long landing message according to one embodiment of the present invention.

DETAILED DESCRIPTION

Figure 1:
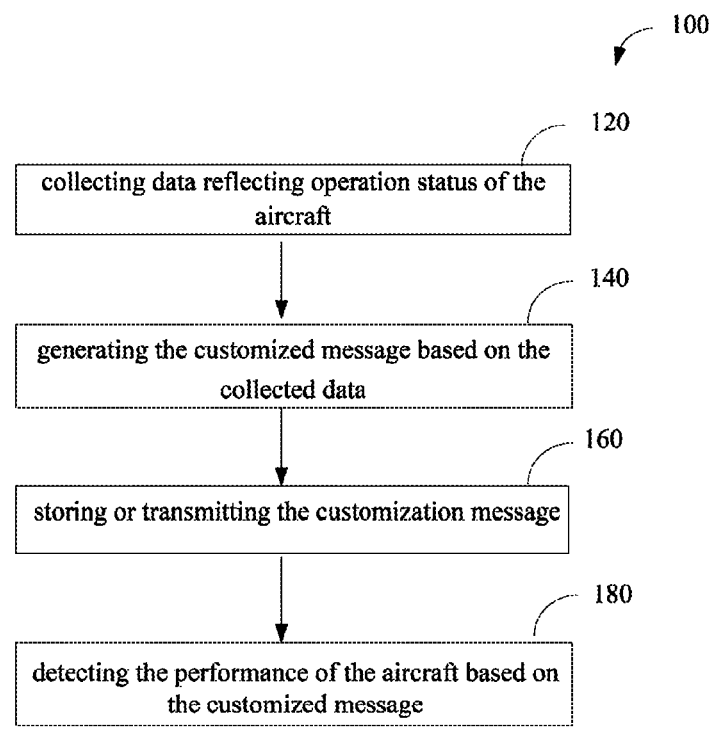
FIG. 1 is a flow chart illustrating a method for detecting the performance of the aircraft based on the customized message according to one embodiment of the present invention.

FIG. 1 is a flow chart illustrating a method for detecting the performance of the aircraft based on the customized message according to one embodiment of the present invention. As shown in FIG. 1, the method 100 includes: at step 120, collecting data reflecting the operation status of the aircraft. According to one embodiment of the present invention, the data reflecting the operation status of the aircraft can be collected by the aircraft data system. The aircraft data system achieves great development, such as ACMS (Aircraft Condition Monitoring System) of Airbus and AHM (Aircraft Heath Monitor) of Boeing, as the aircraft system is more and more complicated.

Taking the ACMS as an example, the ACMS monitors performance of multiple important components of the aircraft including: the engine, crew, APU (Airborne Auxiliary Power Unit) and cabin. The ACMS also has functions such as aircraft performance monitoring, date recording, special investigation & trouble shooting and the like. The ACMS monitors more than 13,000 flight data in real time.

Referring to FIG. 1, the method 100 further includes: at step 140, generating the customized message based on the collected data. This also can be performed by the aircraft data system. The ACMS and AHM can automatically generate messages including specific data according to real-time monitored data, when a certain trigger condition is met. According to one embodiment of the present invention, the ACMS and AHM can be used to generate the customized message.

Taking the ACMS as an example, the ACMS includes an AIDS (Aircraft Integrated Data System). The DMU (Data Management Unit) is the core of the AIDS. The DMU has the following two important functions:

collecting, processing and recording many parameters in the aircraft, including data from the black box. These parameters are stored in an internal nonvolatile storage memory of the DMU or an external recorder, such as a digital AIDS recorder (DAR);

generating system messages. Triggering and generating the messages when the trigger condition is satisfied by the aircraft status or system parameters. These messages are stored a nonvolatile storage memory in the DMU.

Referring to the FIG. 1, the method 100 further includes: at step 160, storing or transmitting the customized message. According to one embodiment of the present invention, the customized message can be stored in a nonvolatile memory in the DMU.

According to one embodiment of the present invention, the customized message can be transmitted by an ACARS (Aircraft Communication Addressing and Reporting System). The ACARS is a digital data link system for transmitting message (i.e., short message) through radio or satellite between an aircraft and a ground station, provides the air-ground and ground-ground large amount of data flow communication to the airline and realizes information exchange.

The ACARS is comprised of an avionics computer called ACARS managing unit (MU), and a control display unit (CDU). The MU is used for sending and receiving VHF radio digital messages to and from the ground. On the ground, the ACARS is comprised of a network including the ground station 410 having a radio transceiver, which can receive or send messages (data link messages). These ground stations generally are owned by service providers, and distribute received messages to respective servers of different airlines on the network.

On the one hand, the ACARS can make the flying aircraft automatically provide real-time data such as flight dynamics, engine parameters and like to the ground station of the airline without crew members' intervention, meanwhile, also transmit other information to the ground station, so that the operating control center of the airline can obtain real-time, uninterrupted, and a great deal of flight data and relevant information on an application system thereof and master their own aircraft's dynamic, monitor the aircraft in real time, meet requirements of relevant departments such as a flight operations department, a operations department, a maintenance department and like. On the other hand, the ground station can provide multiple services to the flying aircraft, such as meteorological information, airway information, troubleshooting measures for emergency fault and like, so as to enhance the guaranteed ability of safety of aircraft and the service level to passengers. Now, normal VHF ground-air communication channel is increasingly burdened, the amount of information transmitted by it is low and speed is slow. In contrast, such bi-directional data communication system can obviously improve and enhance guaranteed ability of the communication between the ground and the flying aircraft.

According to one embodiment of the present invention, the customized message can be transmitted by a communication device or system based on the Aviation Telecommunication Network (ATN).

Referring to FIG. 1, the method 100 further includes: at step 180, detecting the performance of the aircraft based on the customized message. The value of parameters reflecting the operation status of the aircraft can be obtained from the customized message. The performance can be monitored through the values of these parameters, and maintenance "condition based circumstances" can be achieved.

Maintenance according to specific circumstances has been proposed for many years. However, it was not well applied to detect the performance of the aircraft and to maintain the aircraft. One important reason is the cost of decoding the flight data is too high so that such maintenance cannot be performed as a routine. The present invention solves this problem through the customized message, so that the status of the aircraft can be monitored in real time. The present invention fully uses the function that the aircraft data system can obtain the data of operation status of the aircraft, so that the customized message can be generated flexibility according to the actual requirements, and the customized message after being stored and transmitted can conveniently be used to detect the performance of the aircraft.

In order to reflect the status of the aircraft more accurately, the values of parameters obtained directly need to be corrected. According to one embodiment of the present invention, the customized message includes main parameters reflecting directly the status of the aircraft and auxiliary parameters for correcting the main parameters.

When obtaining the data of flying status, the time, which can reflect the status of the aircraft best, needs to be selected to obtain the values of the main parameters or auxiliary parameters of the customized message. Moreover, as to a specific time, a same parameter can be measured many times and then an average value is obtained, so as to obtain more accurate result. Or a maximum value or a minimum value in a period is recorded to reflect limit values of the main parameters or auxiliary parameters. Therefore, the values of the main parameters or auxiliary parameters at one or more timings are obtained in response to one or more trigger conditions.

According to one embodiment of the present invention, the values of main parameters or auxiliary parameters are converted into the values under a specified condition, so as to facilitate detecting the performance of the aircraft.

It is a difficult problem how to select suitable main parameters from so many status parameters of the aircraft to form the customized message, especially for complicated systems which have many parameters.

According to one embodiment of the present invention, multiple parameters related to the operation status of the aircraft are obtained, and then multiple main parameters are determined according to respective physical implications indicated by the multiple parameters. It is possible that the correlations between some main parameters are strong. In this case, changes of one main parameter may represent changes of another main parameter. Therefore, some main parameters that have strong correlations can be removed through calculating the correlations. According to one embodiment of the present application, the method may comprise: calculating correlations between multiple main parameters; and removing one or more of the multiple main parameters based on the correlations between the multiple main parameters. Thus, multiple main parameters can be obtained, wherein the multiple main parameters are independent from each another and can reflect operation status of the aircraft components.

According to one embodiment of the present invention, it is can be determined which parameters are highly related to the failure events of the aircraft through data mining utilizing existing data of the multiple parameters related to the operation status of the aircraft when the parts of the aircraft failed, so that the main parameters can be determined.

According to one embodiment of the present application, a correlation between the data change of the multiple parameters and the failure events of the aircraft component is calculated. The failure events can directly cause the deterioration of some parameters. For example, if a crew oxygen system has a leak, a crew oxygen pressure parameter would drop rapidly. If an engine malfunctions, a rotation speed of the engine would drop rapidly. The deteriorations of these parameters indicate that failures occur. The correlation calculated between a parameter of the operation status of the aircraft and a parameter indicating failure event can reflect a correlation between the parameter and the failure event. According to one embodiment of the present application, the correlation between the parameter of the operation status of the aircraft and the parameter indicating the failure event can be calculated using the partial correlation method. A plurality of partial correlation analysis methods in statistics can be applied to the embodiment. If the correlation calculated between the parameter and the failure event is greater than a threshold, the parameter should be used as a main parameter. The main parameters reflecting status of the aircraft can be obtained through testing all of parameters related to operation status of the aircraft using such a method.

The value of the threshold determines the number of the final obtained main parameters, and the accurate the performance detection is, and certainly, the higher the cost of the method is. If the performance of the aircraft component relates to multiple parameters, and the correlation of each of the multiple parameters is not strong, the value of the threshold should be lower to obtain more parameters. According to one embodiment of the present application, a range of the threshold is 0.3-0.5. If the performance of the aircraft relates to a few parameters, and correlations of some parameters are strong, the value of the threshold can be higher to reduce unnecessary detection. According to one embodiment of the present application, a range of the threshold is 0.6-0.8.

Therefore, the main parameters of the customized message can be determined using the following steps: obtaining multiple parameters related to the operation status of the aircraft; associating the multiple parameters with failure events of the aircraft and calculating correlations between the multiple parameters and the failure events of the aircraft using data mining so as to determine the multiple main parameters. Similarly, correlations between the multiple main parameters can be calculated; and then, one or more of the multiple main parameters are removed based the correlations between the multiple main parameters.

Hereafter it is described how to determine the main parameters and auxiliary parameters of the customized message through an example.

APU (Airborne Auxiliary Power Unit) is a small turbine engine mounted at the tail of an aircraft. The main function of the APU is to provide power and gas source, and a few APUs may provide additive thrust to the aircraft. In particular, the APU supplies power to start a main engine before the aircraft takes off from ground without need to rely on a ground power, gas source vehicle to start the aircraft. When on the ground, APU also supplies power and compressed air to ensure the lighting and air-conditioning in the cockpit and cabin. When the aircraft takes off, the APU can be used as a backup power. After landing, APU still supplies power to the lighting and air-conditioning.

The functions of APU determine the operation stability thereof directly relates to flight cost and quality of service of the aircraft. Moreover, in the absence of guarantees of the ground power and gas source, once there is some malfunction of the APU, the result is that the aircraft cannot fly. At present, the troubleshooting and maintenance of the APU always are post-processing. However, among the equipments of aircraft, the maintenance cost of APU is higher. In addition, the price of parts of APU is higher, the cost for storing the spare parts is higher, and the repair cycle reaches up to 4-5 months. The stable operation of the APU cannot be guaranteed due to the post-processing maintenance. Moreover, the repair cycle is time-consuming, which directly causes the aircraft delays even to be grounded.

According to one embodiment of the present application, the operation status of the APU can be determined through generating a customized APU message. When determining the main parameters of the customized APU message, a plurality of parameters relate to operation status of the APU because the APU system is relatively complicated. For example, the operation parameter in the stage where the engine is started includes the EGT, the opening angle of the IGV, the inlet pressure of the compressor, the load compressor inlet temperature, the flow rate of the bleed air, the pressure of the bleed air, the oil temperature and the APU generator load. The parameter when the APU starts includes the starting time, the EGT peak value, the rotation speed at the EGT peak value and the load compressor inlet temperature.

As to the engine, there are two most important indicators influencing the heat engine, one is the service time, another is EGT (Exhaust Gas Temperature). When the APU has a failure, the EGT of the APU would increase and be close to an limit value. Therefore, valuable information can be obtained from these two parameters. In this embodiment, the external influence, such as the altitude, total air temperature, loads of generator, flow rate of bleed air, inlet pressure, load compressor inlet temperature, is removed through a method of partial correlation. The following result is obtained by performing a data analysis on actual data of the APU:

| Correlations Control Variables | Variables | description | TSR | STA | EGTA_EMAX | IGV_EMAX | PT_EMAX | OTA_MAX |
|---|---|---|---|---|---|---|---|---|
| Altitude & total temperature & loads of generator & flow rate of bleed air & | TSR | Correlation | 1.00 | 0.25 | 0.24 | −0.06 | −0.02 | 0.29 |
| | | Significance 2-tailed) | | 0.00 | 0.00 | 0.00 | 0.06 | 0.00 |
| | | | 0.00 | 11023.00 | 11023.00 | 11023.00 | 11023.00 | 11023.00 |
| | STA | Correlation | 0.23 | 1.00 | 0.33 | −0.04 | −0.10 | 0.32 |
| | | Significance 2-tailed) | 0.00 | | 0.00 | 0.00 | 0.00 | 0.00 |

| Correlations Control Variables | Variables | description | TSR | STA | EGTA_EMAX | IGV_EMAX | PT_EMAX | OTA_MAX |
|---|---|---|---|---|---|---|---|---|
| inlet pressure & load compressor inlet temperature | | df | 11023.00 | 0.00 | 11023.00 | 11023.00 | 11023.00 | 11023.00 |
| | EGTA_EMAX | Correlation | 0.24 | 0.33 | 1.00 | −0.51 | 0.20 | −0.01 |
| | | Significance 2-tailed) | 0.00 | 0.00 | . | 0.00 | 0.00 | 0.19 |
| | | df | 11023.00 | 11023.00 | 11023.00 | 11023.00 | 11023.00 | 11023.00 |
| | IGV_EMAX | Correlation | −0.06 | −0.04 | −0.51 | 1.00 | −0.40 | 0.55 |
| | | Significance 2-tailed) | 0.00 | 0.00 | 0.00 | . | 0.00 | 0.00 |
| | | df | 11023.00 | 11023.00 | 11023.00 | 11023.00 | 11023.00 | 11023.00 |
| | PT_EMAX | Correlation | −0.02 | −0.10 | 0.20 | −0.40 | 1.00 | −0.21 |
| | | Significance 2-tailed) | 0.06 | 0.00 | 0.00 | 0.00 | . | −0.00 |
| | | df | 11023.00 | 11023.00 | 11023.00 | 11023.00 | 0.00 | 11023.00 |
| | OTA_EMAX | Correlation | 0.29 | 0.32 | −0.01 | 0.55 | −0.21 | 1.00 |
| | | Significance 2-tailed) | 0.00 | 0.00 | 0.19 | 0.00 | 0.00 | . |
| | | df | 11023.00 | 11023.00 | 11023.00 | 11023.00 | 11023.00 | 0.00 |

In this embodiment, a correlation r is divided into three levels: $|r|<0.4$, which means the correlation is a low linear correlation; $0.4 \leq |r| < 0.7$, which means the correlation is a significant correlation; $0.7 \leq |r| < 1$, which means the correlation is a high linear correlation.

It is obtained through analysis that the correlations between TSR (service time), STA (starting time), EGT (Exhaust Gas Temperature) and PT (pressure of bleed air) are low, however, the correlations between an angle of IGV (Inlet Guide Vane) and TSR, STA, EGT and PT and the correlations between OTA (Oil temperature) and TSR, STA, EGT and PT are strong.

It can be seen from the above, the angle of the IGV and OTA can be represented by the TSR, STA, EGT and PT, when the APU components operate normally. It also can be seen that the TSR, STA, EGT and PT are relatively independent, and each of them indicates a certain operation character of the APU. The overall performance of the APU can be reflected through effective combination of these four parameters utilizing characters thereof.

The generation of the customized message also can be customized. According to one embodiment of the present application, a first process, which is used to monitor whether the trigger condition is met, is started in the aircraft data system firstly. If the trigger condition is met, the aircraft data system turns to a task processing customized message to perform relevant processing on the customized message. An advantage of such design is in that the task for the customized message need not to be monitored by the aircraft data system under the untriggered status so as to save the system resource. Only when the trigger condition is met, the task for the customized message will be started.

According to one embodiment of the present application, the first process starts a second and a third process, wherein, the second process is used to monitor whether the condition of generating the customized message is met and the third process is used to collect the values of the main parameters and auxiliary parameters required by the customized message. Moreover, when the second process determined that the condition of generating the customized message is met, then the customized message is generated using the values of the main parameters and auxiliary parameters collected in the third process. The condition of generating the customized message can be controlled flexibility in such a manner, so that the customized message is generated only when a certain condition is met.

Hereafter it is described how to generate the customized message.

The engine's bleed air system is a premise to ensure safe and reliable operation of the aircraft air-conditioning system, pressurization system, wing anti-icing system, hydraulic system and the like. However, the maintenance of the aircraft has been struggled with difficult issues of a high incidence rate, high repetition rate, long troubleshooting time and difficulty. At present, normal methods cannot process data timely and accurately, so that the troubleshooting cannot be performed timely, which may cause a disruption of flight even major unsafe events.

According to the method of the present invention, the engine bleed air system can be detected through generating the customized bleed air message. For reflecting the performance of the engine bleed air system, the outlet temperature of precoolers of the left and right engines need to be detected. If the temperature is too high or too low, both mean the engine bleed air system may have failure. Therefore, the main parameters of the customized bleed air message includes: a period in which the outlet temperature of precoolers of the left and right engines is higher than 220° C. or lower than 155° C., and the outlet temperature of precoolers of the left and right engines in that period or a maximum value or a minimum value of the outlet temperature of precoolers of the left and right engines in that period. The auxiliary parameters of the customized bleed air message may include: an altitude of the aircraft and the ambient temperature.

According the method of the present invention, the first process is started in the aircraft data system to determine whether the aircraft is in takeoff stage, climbing stage or descending stage. If it is determined the aircraft is in takeoff stage, climbing stage or descending stage, the second and third process will be started, wherein, the second process is used to determine whether the outlet temperature of precoolers of the left and right engines is higher than 220° C. or lower than 155° C. and maintains for more than 5 seconds, and the third process is used to collect the outlet temperature of precoolers of the left and right engines, altitude of the aircraft and the ambient temperature at every second.

If the outlet temperature of precoolers of the left and right engines is higher than 220° C. or lower than 155° C. and maintains for more than 5 seconds (duration), the customized bleed air message will be generated according to the collected outlet temperature of precoolers of the left and right engines, altitude of the aircraft and the ambient temperature and corresponding information of the duration.

The customized bleed air message can be stored in the DMU to be viewed and printed by the flight crew or repairman. The customized bleed air message also can be transmitted to a server of the airline by the ACARS so as to monitor the performance of the bleed air system the aircraft in real time. The airline on the ground can make a decision according to the determined performance of the engine bleed air system, even require the aircraft to land and to be maintained.

According the method of the present invention, the trigger condition of the customized message or the generating condition of the message can be modified. For example, the trigger condition of the customized message can be configured to make the customized message be generated at each flight. An advantage of such manner is in that a lot of selected flight data can be obtained conveniently. As to many performance detection models or maintenance models, they need a lot of actual data for training and learning. The customized message is the best manner to provide such training data.

After collecting the customized messages of multiple flights, the performance of the aircraft can be detected based on an actual physical model, a feature evolution model or an intelligent model through using the data of flight status provided by the customized message of multiple flights.

The so-called actual physical model is a model, which is built using the actual physical characteristic of the aircraft's components. The model can actually reflect the real status of the performance of the aircraft.

The so-called feature evolution model is a model reflecting the performance of the aircraft through the decline rates of the performance of the aircraft. It is built based on the known fault models. This model also can substantially reflect the performance of the aircraft.

The so-called intelligent model is an "intelligent" model formed through learning or training from lots of data without an accurate mathematical or physical model. Neural network model is a common intelligent model.

Different models can be built for aircraft's different components so as to reflect status of these components. The customized message is helpful to build these models. Moreover, the customized message can be analyzed based on these models so as to realize performance detection of the aircraft.

According to one embodiment of the present invention, after the performance of the aircraft is determined using the method for detecting the performance of the aircraft in the embodiments described above of the present invention, if the results of detection indicate the performance of the aircraft already has failed, the aircraft can be maintained immediately. If the results of detection indicate the performance of the aircraft is in the decline period, the aircraft can be arranged to be maintained at an appropriate time. Therefore, the "condition based" maintenance can be realized.

Hereafter the method for detecting the performance of the aircraft based on the customized message of the present invention is described through three examples.

Example of the Crew Oxygen System

Figure 2:
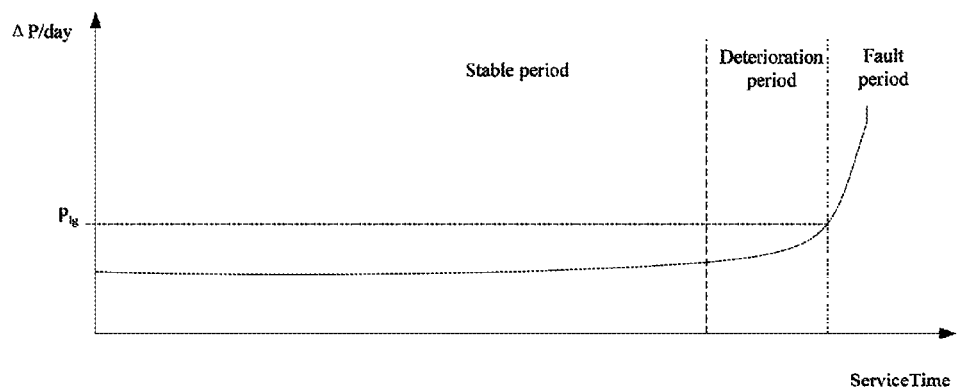
FIG. 2 is a schematic illustrating change of the performance of the aircraft crew oxygen system.

FIG. 2 is a schematic illustrating a performance curve of the crew oxygen system. Every oxygen system has a certain level of gas leakage, therefore, when the temperature is fixed, pressure difference ΔP will be produced at different time. The gas leakage rate can be represented as PL=ΔP/t. When the gas leakage rate is stable, the performance of the crew oxygen system is in stable period; when the gas leakage ratio PL gradually increases, the performance of the crew oxygen system enters deterioration period; when the gas leakage ratio PL is larger than a threshold $P_{Lg}$, the performance of the crew oxygen system enters failure period, failure may happen, which can influence safety of flight and easily causes unscheduled maintenance, and thus result in delay of aircraft and being grounded. In present technology, there is no any means to detect if the crew oxygen system enters deterioration period. However, according to one embodiment of the present invention, this detection is possible.

As to the crew oxygen system, the main parameters are easier to be obtained. The oxygen pressure of the oxygen cylinder is the best main parameter for reflecting the performance of the crew oxygen system. Since the oxygen pressure in the oxygen cylinder of the crew oxygen system is related to the temperature, the oxygen pressure and the temperature in the oxygen cylinder must be obtained simultaneously. However, a temperature sensor generally is not provided in the oxygen system. Therefore, the temperature in the oxygen cylinder need to be calculated based on other temperature which can be measured.

In consideration of the position of the oxygen cylinder in the crew oxygen system, according to one embodiment of the present invention, the following formula can be used to obtain the oxygen temperature in the oxygen cylinder:

$$T = \frac{k_1 Tat + k_2 Tc}{2} \quad (1)$$

where, Tat is the ambient air temperature or the temperature outside the airplane, Tc is the cockpit temperature, k1 and k2 are adjustment parameters and k1+k2=2. According to one embodiment of the present invention, k1>k2. That is, the oxygen temperature T is related to the ambient air temperature Tat and the cockpit temperature Tc, and the ambient air temperature has greater influence (is more relevant). Certainly, other mean value formulas also can be used to calculate the oxygen temperature.

According to one embodiment of the present invention, k1=k2. That is, the formula (1) can be changed to:

$$T = k \frac{Tat + Tc}{2} \quad (2)$$

where, k is the adjustment parameter. According to one example of the present invention, k is close to 1. Each of k, k1 and k2 can be obtained through measurement or statistical analysis.

According to one embodiment of the present invention, k=1. Then formula (2) can be changed to:

$$T = \frac{Tat + Tc}{2} \quad (3)$$

The oxygen temperature obtained based on the formula (3), which may be less precise than those calculated from the formula (1) and the formula (2), is enough for the system for detecting the performance of the crew oxygen system in this embodiments of the present invention.

After the oxygen temperature is obtained, the crew oxygen pressure measured under different temperatures can be transformed into the standard state pressure under the standard temperature, so as to make a comparison and calculate the leakage rate. The standard state pressure can be calculated by the following formula:

$$P_s = \frac{T}{T_s} \qquad (4)$$

where, $P_s$ is the standard state pressure, $T_s$ is the standard temperature, P is the obtained oxygen pressure through measurement, T is the oxygen temperature when measuring. The standard temperature can be 20° C. Certainly, the standard temperature also can be other temperature.

Figure 3:
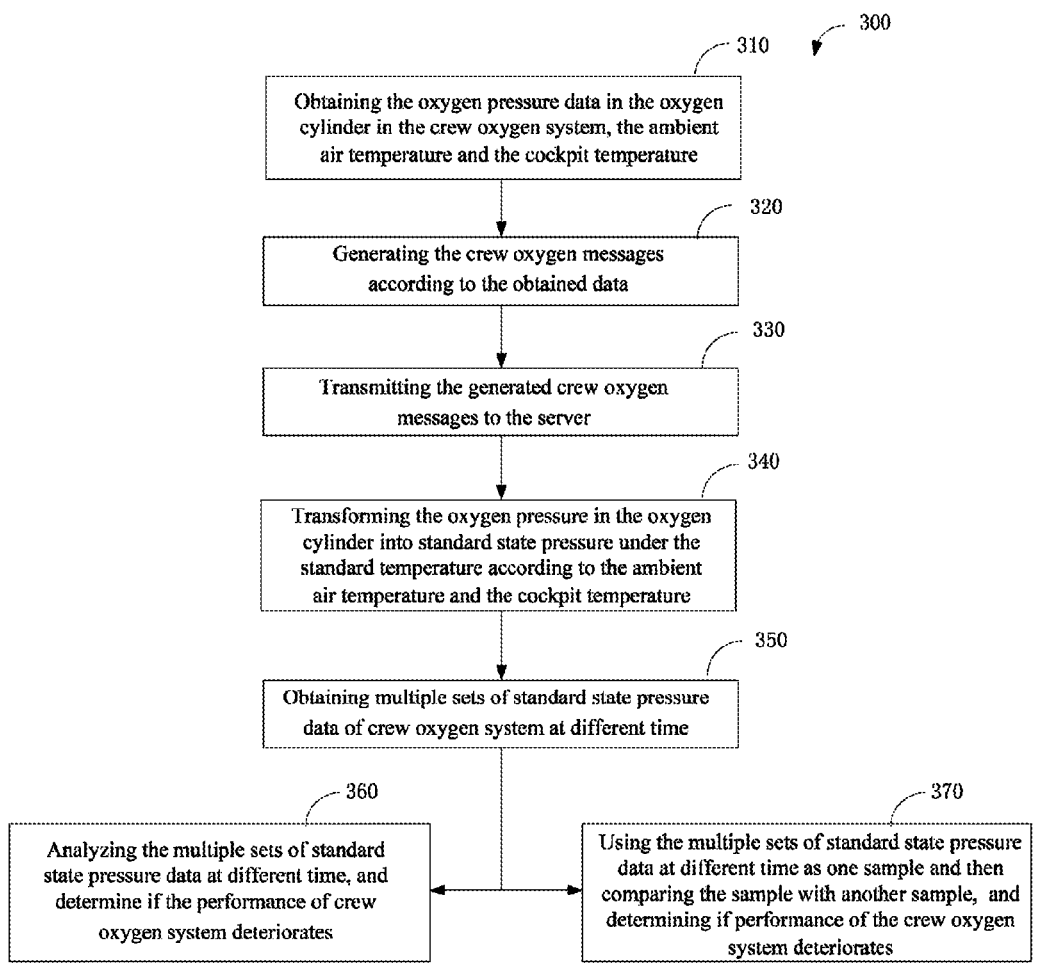
FIG. 3 is a flow chart illustrating a method for detecting the performance of the aircraft crew oxygen system according to one embodiment of the present invention

FIG. 3 is a flow chart illustrating a method for detecting the performance of the crew oxygen system according to one embodiment of the present invention. In the method 300 for detecting the performance of the crew oxygen system as shown in FIG. 3, at step 310, the oxygen pressure data in the oxygen cylinder in the crew oxygen system, the ambient air temperature and the cockpit temperature are obtained. At step 320, crew oxygen messages are generated according to obtained oxygen pressure data in the oxygen cylinder in the crew oxygen system, the ambient air temperature and the cockpit temperature.

At step 330, the generated crew oxygen messages are transmitted to the server for processing crew oxygen messages. At step 340, the oxygen pressure in the oxygen cylinder in the crew oxygen system is transformed into standard state pressure under the standard temperature by the server according to the ambient air temperature and the cockpit temperature. The standard temperature can be 20° C. Certainly, the standard temperature also can be other temperature.

As shown in FIG. 3, at step 350, multiple sets of standard state pressure data of crew oxygen system at different time are obtained in the way of steps 310-340. After multiple sets of standard state pressure data of the oxygen of the crew oxygen system at different time are obtained, the performance of the crew oxygen system can be determined by processing and evaluating the obtained data. FIG. 4 shows an example of customized crew oxygen message according to an embodiment of the present invention.

At step 360, the multiple sets of standard state pressure data at different time are analyzed, so as to determine if the performance of crew oxygen system deteriorates. Or, at step 370, the multiple sets of standard state pressure data at different time serve as one sample and then the sample is compared with another sample of another set of standard state pressure data of the same type of aircraft, so as to determine if performance of the crew oxygen system deteriorates.

According to one embodiment of the present invention, the leg leakage rate is used to determine if performance of the crew oxygen system deteriorates. The leg leakage rate of the crew oxygen system can be calculated by the following formula:

$$P_L = \frac{\Delta P_s}{t} = \frac{P_{s1} - P_{s2}}{t_2 - t_1} \qquad (5)$$

where, $t_1$ is take-off time, $t_2$ is landing time, $P_{s1}$ is standard state pressure of the crew oxygen system when aircraft takes-off, $P_{s2}$ is standard state pressure of the crew oxygen system after landing. Therefore, performance of the crew oxygen system can be determined according to the difference $\Delta P_s$ between the standard state pressure of the crew oxygen system before taking-off and that after landing. For example, if the value of $\Delta P_s = P_{s1} - P_{s2}$ is larger than 100 PSI, it means that the performance of the crew oxygen system deteriorates.

Performance of the crew oxygen system also can be determined according to the leg leakage rate. For example, if the leg leakage rate $$P_L = \frac{\Delta P_s}{t} = \frac{P_{s1} - P_{s2}}{t_2 - t_1}$$

is larger that 48 PSI/day, it means the performance of the crew oxygen system deteriorates.

The pressure of the crew oxygen system under a certain temperature can be evaluated according to the calculated leg leakage rate. This can obviously reduce such case, i.e., unscheduled replacement of oxygen cylinder before flight caused by the fact that the aircraft temperature of the aircraft after the flight and the temperature when the engine is cold are greatly different.

According to one embodiment of the present invention, performance of the crew oxygen system can be determined through statistical relation between the oxygen standard state pressure Ps of the crew oxygen system and installation time $t_o$ of oxygen cylinder of the crew oxygen system, and through the calculation of the slope of fitting curves.

The relationship between $P_s$ and $t_o$ meet the following formula:

$$P_s = \beta 1 + \beta 2 \ast t_o + \mu \qquad (6)$$

where, $P_s$ is the standard state pressure, $t_o$ is the installation time of oxygen cylinder of the crew oxygen system, β1 is an intercept term which relate s to flight time; β2 is a slope term which indicates the gas tightness of oxygen system; μ is a random term which indicates uncertainty between $P_s$ and $t_o$.

Mean value of $t_o$ can be expressed as following:

$$t_{o-avg} = \frac{1}{n} \sum_{l=1}^{l=n} (t_{o1} + \ldots + t_{on}) \qquad (7)$$

where, n is the number of sampled points which are used in the calculation.

Mean value of Ps can be expressed as following:

$$P_{s-avg} = \frac{1}{n} \sum_{l=1}^{l=n} (P_{s1} + \ldots P_{sn}) \qquad (8)$$

where, n is the number of sampled points which are used in the calculation.

β2 also can be determined by the following formula according to formulas (6)-(8):

$$\beta 2 = \frac{\sum_{l=1}^{n} (t_{ol} - t_{o-avg}) \ast (P_{sl} - P_{s-avg})}{\sum_{l=1}^{l=n} (t_{ol} - t_{o-avg})^2} \qquad (9)$$

The β2 is a negative value. The smaller the value of β2 is, the worse the air tightness of crew oxygen system is. The performance of crew oxygen system can be determined through detecting change of β2, i.e., the slope term. The performance of crew oxygen system also can be determined through making a comparison between slope terms of different aircrafts.

When performing performance detection of crew oxygen system using above slope detection method, it would be better if there is no replacement of oxygen cylinder or oxygenating in the period represented by data points which are used in the calculation.

According to one embodiment of the present invention, the deterioration of the performance of the crew oxygen system can be determined through the independent sample test to leakage rate.

Since the interval of flight leg time is short, the change of system pressure may be slight, the obtained standard state pressure fluctuates greatly sometimes due to the influence by the fitting accuracy of external temperature and detection accuracy of the pressure sensor. For reducing the influence by the accuracy of external temperature and accuracy of the pressure sensor, one embodiment of the present invention does not use the leg leakage rate, but uses two points which are more than 24-hour apart to compare the pressure at those two points, that is, adopts the 24-hour interval leakage rate $P_{L24}$. Certainly, other intervals also can be adopted, such as an interval which is greater than 12-hour or 36-hour. Meanwhile, for removing bad data point effect caused by sampling, $P_{L24}$ may be 3 days rolling average which means the average value is calculated from all of $P_{L24}$ in 3 days. The person skilled in the art can understand that 3 days is only an example, other days, such 2-4 days also can be used based on special data condition.

According to one embodiment of the present invention, the 24-hour interval 3 days rolling average leakage rate $P_{L-avg24}$, which indicates performance of crew oxygen system, can be calculated by the following formula:

$$P_{L-avg24} = \frac{1}{n}\sum_{l=1}^{l=n}(P_{L24\_1} + \ldots P_{L24\_n}) \quad (10)$$

where, n is the number of data points in 3 days.

According to one embodiment of the present invention, when it is required to know if performance of crew oxygen system changes in a certain period, the data in that period can be selected as a set of samples; meanwhile, another set of data of an aircraft of the same type can be selected as another set of samples. It is determined if the two sets of data are significantly different, through making a comparison between respective $P_{L-avg24}$ of two sets of samples, according to the statistical probability, so that the period and degree of deterioration of performance of crew oxygen system can be determined.

According to one embodiment of the present invention, respective $P_{L-avg24}$ of two sets of data and variance of $P_{L-avg24}$ are calculated firstly. Assume $S1^2$ is the variance of the first set of $P_{L-avg24}$ (including n data), $S2^2$ is the variance of the second set of $P_{L-avg24}$ (including m data). Since $S1^2/S2^2$ should follow $F(n-1,m-1)$ distribution, the value of F can be determined by searching the F distribution table. It can be determined if the difference between two sets of data is significant according to the value of F. If the probability that the two sets of data belong to the same distribution is less than 2.5%, it can be determined that the difference of two sets of data is significant.

It can be determined if the difference between two sets of data is significant through other independent sample T test. If the difference is significant, it can be determined there is significant change on performance of crew oxygen system. Given it is determined there occurs significant change on performance of crew oxygen system, it is easy to determine which set of data indicates that the performance of crew oxygen system deteriorates according to the average value of leakage rate.

The independent sample test for average leakage rate either uses data at different time of the same aircraft, or uses data of a different aircraft of the same type. Therefore, this method is flexible. Moreover, this detection manner is not limited by replacement of oxygen cylinder and oxygenation, and can be used to determine if significant change occurred on performance of crew oxygen system between before and after replacement of oxygen cylinder and oxygenating.

Hereinafter, how to determine if significant change occurs to the performance of crew oxygen system using the method of the present invention is described through some embodiments.

Figure 5:
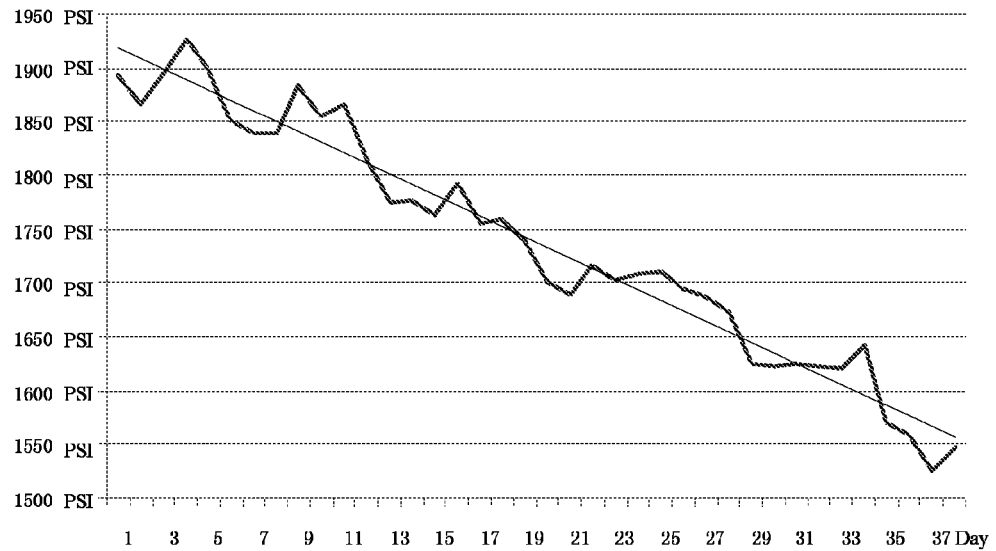
FIG. 5 is a schematic illustrating the relationship between the oxygen pressure in the oxygen cylinder in standard state and measuring time according to one embodiment of the present invention.

FIG. 5 is a schematic illustrating the relationship between standard state pressure of oxygen in the oxygen cylinder of the crew oxygen system and measuring time according to one embodiment of the present invention. The curve shown in FIG. 5 indicates the standard state pressure of actual sampling and transforming, straight line indicates regression line according to the standard state pressure of oxygen and measuring time. It can be found using the formula (9) of slope detection method that leakage rate of crew oxygen system is large, slope is −0.024929 which is much lower than a normal slope −0.015. This indicates performance of crew oxygen system deteriorates and has entered deterioration period.

Figure 6:
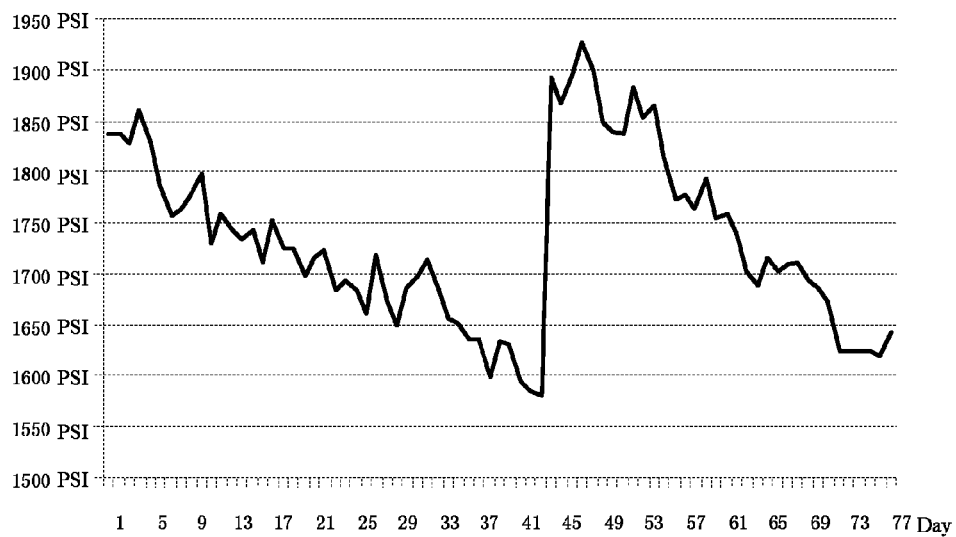
FIG. 6 is a schematic illustrating the relationship between the oxygen pressure in the oxygen cylinder in standard state and measuring time according to one embodiment of the present invention.
Figure 7:
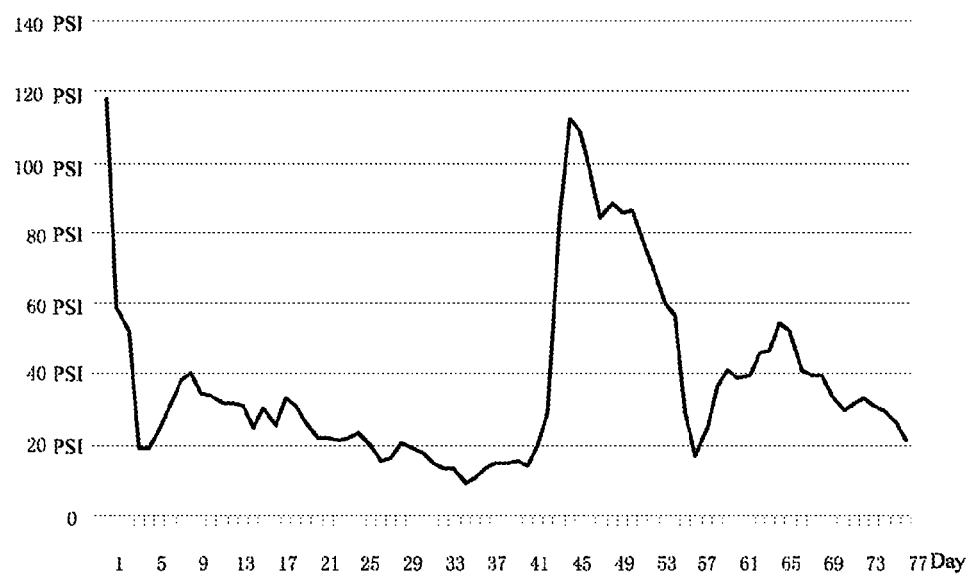
FIG. 7 is a schematic illustrating the relationship between a 24-hour 3-days rolling average leakage rate of the crew oxygen system and measuring time according to the embodiment shown in FIG. 6.

FIG. 6 is a schematic illustrating the relationship between standard state pressure of oxygen in the oxygen cylinder of the crew oxygen system and measuring time according to one embodiment of the present invention. FIG. 6 shows a process of replacement of oxygen cylinder of crew oxygen system. The dots shown in FIG. 6 indicate the standard state pressure representing actual sampling and transforming FIG. 7 is a schematic illustrating the relationship between a 24-hour 3-days rolling average leakage rate and measuring time of oxygen in the oxygen cylinder of the crew oxygen system according to the embodiment shown in FIG. 6. Two sets of data obtained respectively before and after replacement of oxygen cylinder serve as two samples, and independent sample T test is used to determine if the two samples are identical. The calculation results indicate the probability that two sets of data obtained respectively before and after replacement of oxygen cylinder are identical is zero. The performance of crew oxygen system declines, and the average leakage rate doubles. The performance of crew oxygen system has entered deterioration period.

It can be seen from FIGS. 5-7, the method described in the present invention can determine if performance of crew oxygen system degrades and enters deterioration period or failure period of crew oxygen system, through processing and analyzing oxygen pressure data of crew oxygen system and temperature data obtained from crew oxygen messages, and through calculation of slope or independent sample T test and like.

Figure 8:
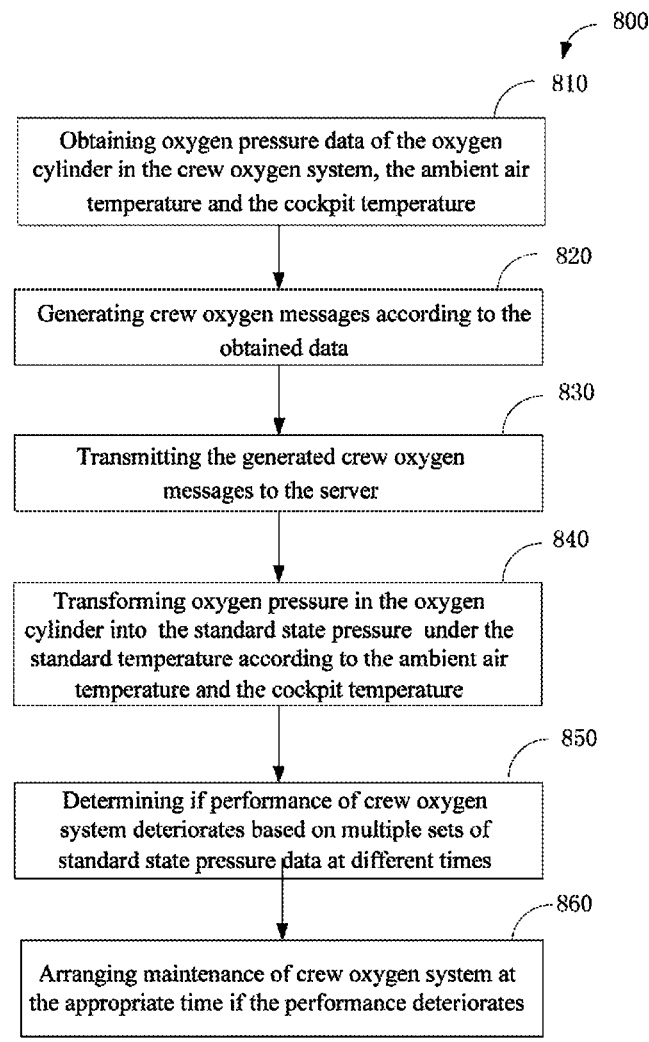
FIG. 8 is a flow chart illustrating a method for maintenance of the aircraft crew oxygen system according to one embodiment of the present invention.

FIG. 8 is a flow chart illustrating a method for maintaining the aircraft crew oxygen system according to one embodiment of the present invention. In the method 800 for maintaining the aircraft crew oxygen system shown in FIG. 7, at step 810, oxygen pressure data of the oxygen cylinder in the crew oxygen system, the ambient air temperature and the cockpit temperature are obtained. At step 820, oxygen messages are generated from obtained oxygen pressure data of the oxygen cylinder in the crew oxygen system, the ambient air temperature and the cockpit temperature. At step 830, the generated crew oxygen messages are transmitted to the server. At step 840, the crew oxygen messages are processed by the server to obtain standard state pressure of oxygen cylinder of the crew oxygen system under the standardized temperature. At step 850, it can be determined if performance of crew oxygen system deteriorates based on multiple sets of standard state pressure data at different times. At step 860, if performance of crew oxygen system deteriorates, maintenance of crew oxygen system at the appropriate time is arranged.

Example of Detecting the Landing Quality of the Aircraft

The so-called "heavy landing" or "hard landing" indicates a landing event in which speed or acceleration speed of the aircraft in vertical direction is above respective limit value when landing, wherein heavy landing means that vertical speed or acceleration speed of the aircraft is above respective limit value when landing in case that the landing weight of the aircraft is above the maximum landing weight, and hard landing means that vertical speed or acceleration speed of the aircraft is above respective limit value when landing in case that the landing weight of the aircraft is less than or equal to the maximum landing weight. The hard/heavy landing can impose strong impact and vibration on the structure of the aircraft, particularly the components withstanding greater loads such as the wing, landing gear, engine and the like, and cause failure of the structure of the aircraft. Therefore, the airline must perform a strict safety-check on the aircraft to ensure aviation safety once the hard/heavy landing occurs.

According to provisions of aircraft manufacturer, the subject of liability for reporting the happened hard/heavy landing event is the flight crew. However, the hard/heavy landing event reported by the flight crew has great uncertainty. The final results of most hard/heavy landing events reported by the flight crew are "the hard/heavy landing has not occurred". But the processing causes an interruption of service of the aircraft and a big waste of maintenance resource.

Therefore, repairmen have to provide the original flight data to the aircraft manufacturer for analysis once the flight crew reports the hard or heavy landing event according to conventional technique. Such manner is not only expensive but also time-consuming and influences the aircraft's normal flight.

According to one embodiment of the present invention, the hard/heavy landing can be detected through the customized landing message. The customized landing message includes but is not limited to the following data:

1. RALT (radio altitude, its unit is ft), RALR (vertical speed rate, its unit is ft/sec), PTCH (pitch angle, its unit is deg), PTCR (pitch speed rate, its unit is deg/sec), ROLL (rolling angle, its unit is deg), ROLR (rolling speed rate, its unit is deg/sec), and YAW (yaw speed rate, its unit is deg/sec) at the time of 1 second before touchdown;

2. RALT (radio altitude, its unit is ft), RALR (vertical speed rate, its unit is ft/sec), PTCH (pitch angle, its unit is deg), PTCR (pitch speed rate, its unit is deg/sec), ROLL (rolling angle, its unit is deg), ROLR (rolling speed rate, its unit is deg/sec), and YAW (yaw speed rate, its unit is deg/sec) at the time of touchdown;

3. Respective maximum values and minimum values of VRTA (vertical load), LONA (longitudinal load) and LATA (lateral load) from the time of 1 second before touchdown to the time of touchdown; and 4. Respective maximum values and minimum values of VRTA (vertical load), LONA (longitudinal load) and LATA (lateral load) from the time of 1 second before touchdown to the time of 3 seconds after touchdown.

It should be noted that the data obtained by the ACMS is measured in real time and stored in a data caching. When a pre-set trigger condition is met, it is possible and can be realized to obtain related data (corresponding to the time before triggering) from the data caching.

Figure 9:
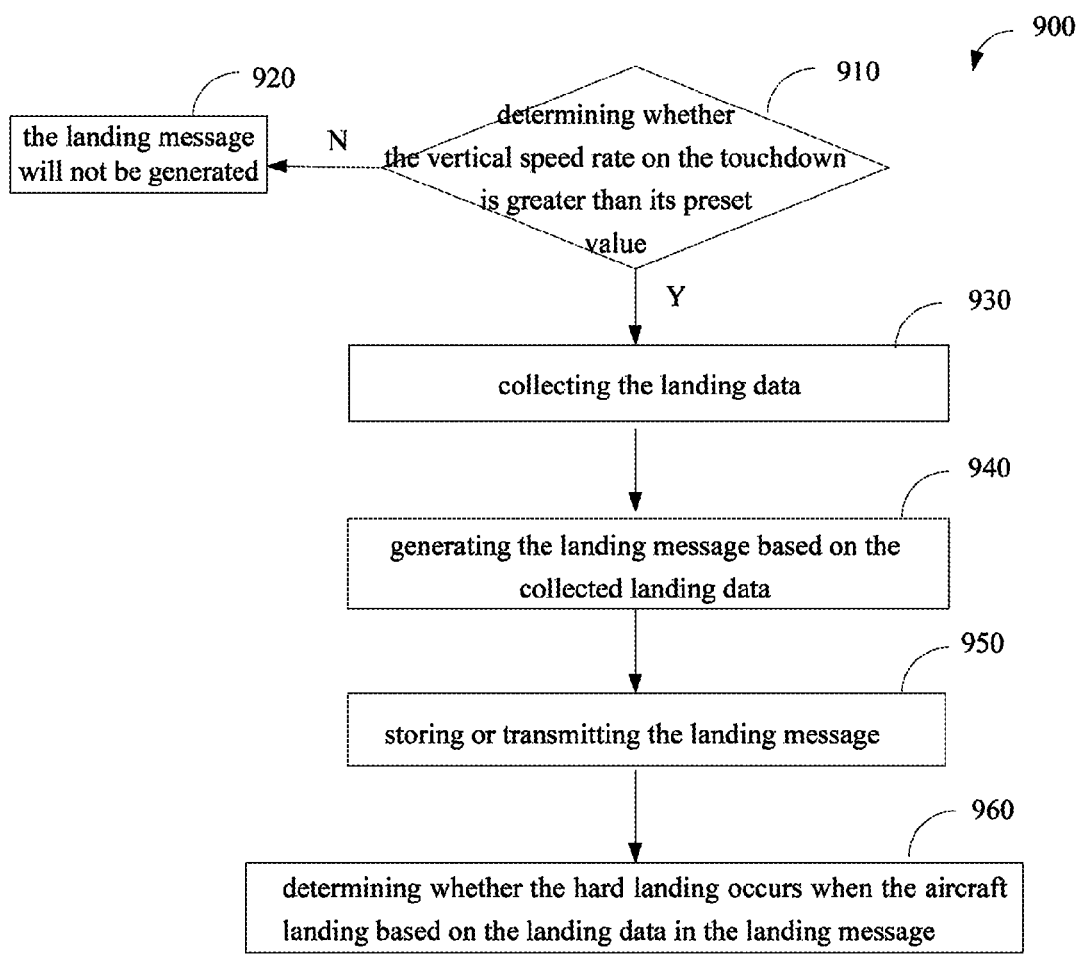
FIG. 9 is a flow chart illustrating a method for detecting landing quality of the aircraft according to one embodiment of the present invention.

FIG. 9 is a flow chart illustrating a method for detecting the aircraft's landing quality according to one embodiment of the present invention. As shown, the method 900 for detecting the landing quality of the aircraft in this embodiment includes: at step 910, determining whether the vertical speed rate is greater than a preset value when the aircraft touches down; if the vertical speed rate is not greater than the preset value, the landing message need not be generated at step 920.

It is ensured that all of data of suspected landing events can be recorded through setting a suitable preset value for the vertical speed rate at step 920. According to one embodiment of the present invention, the absolute value of the preset value for the vertical speed is less than or equal to 0.5 ft/s (feet/second). That preset value for the vertical speed can ensure that data can be obtained and the landing message can be generated every time the aircraft touches down, even the aircraft touches down normally.

Another advantage for setting the preset value for the vertical speed is that the trigger condition for generating the landing message can be changed flexibly, the user can collect and record data of landing state of the aircraft based on actual requirements rather than only collect and record data related to hard or heavy landing or collect and record data at each landing. For example, the preset value for the vertical speed rate can be lowered, e.g., 20%-40% less than the limit value of the vertical speed rate, so that data is collected and recorded and the landing message is generated as long as the landing is relatively hard or heavy.

Landing data is collected at step 930 if the vertical speed rate when landing is greater than the preset value. Then, at step 940, the landing message is generated according to the collected landing data. At step 930, the ACMS of the aircraft may be used to collect the landing data. The DMU of the ACMS starts corresponding collecting process to collect the landing data according to a specific trigger condition. After data collection is finished, at step 940, the landing message is generated according to the collected landing data.

At step 950, the landing message is stored or transmitted. At step 960, it is determined whether the hard or heavy landing occurs during the landing of the aircraft according to the landing data in the landing message.

According to one embodiment of the present invention, it is determined whether the hard or heavy landing occurs through determining whether the value of speed or acceleration in vertical direction when landing is greater than their respective limit value. Considered from the limit of structural strength of the aircraft, the limit value of vertical speed rate of the aircraft relates to the landing weight of the aircraft. When determining whether the RALR (vertical speed rate) is greater than the limit value thereof, comparison should be respectively performed according to the landing weight of the aircraft. According to one embodiment of the present invention, the limit value is −9 ft/sec, where the landing weight of the aircraft is less than the maximum landing weight; the limit value is −6 ft/sec, where the landing weight of the aircraft is greater than the maximum landing weight. The values mentioned above are only examples, and the limit values of different aircrafts may be different where the landing weight is greater or less than maximum landing weight thereof.

Similar to the logic of determining whether the vertical speed rate is greater than the limit value thereof, when determining whether the VRTA (vertical load) is greater than the limit value thereof, the limit value of vertical load of the aircraft also relates to the landing weight of the aircraft. According to one embodiment of the present invention, the limit value is 2.6 G, where the landing weight of the aircraft is less than the maximum landing weight; the limit value is 1.7 G, where the landing weight of the aircraft is greater than the maximum landing weight. The values mentioned above are only examples, and the limit values of different aircrafts may be different where the landing weight is greater or less than maximum landing weight thereof.

Many times, it can be directly determined whether the hard or heavy landing occurs through considering whether the vertical speed rate and vertical acceleration speed when landing are greater than or close to their respective limit values. It can provide valuable reference information for determining whether the hard/heavy landing occurs when landing, even through a determination cannot be obtained directly. If it can be determined whether the hard or heavy landing occurs when the aircraft lands through a combination of flight crew's report and other factors, the original data need not to be transmitted to the airline to be processed.

Figure 10:
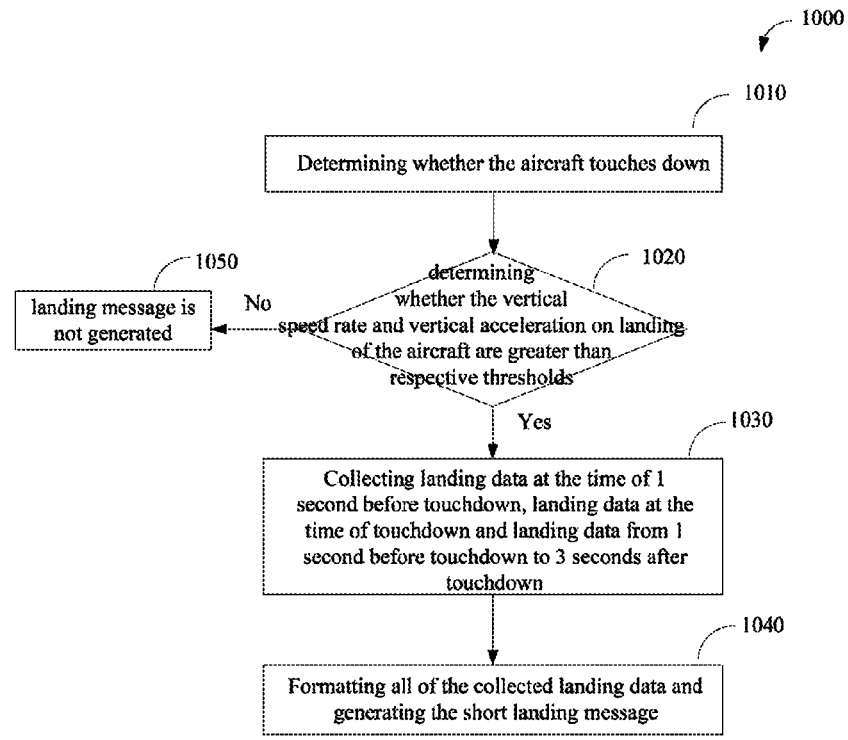
FIG. 10 is a flow chart illustrating a method for generating a landing message using ACMS according to one embodiment of the present invention.

FIG. 10 is a flow chart illustrating a method for generating a landing message using ACMS according to one embodiment of the present invention. As shown, the method 1000 for collecting landing data in this embodiment includes: at step 1010, determining whether the aircraft touches down. According to one embodiment of the present invention, it is determined whether the aircraft touches down through detecting whether the shock strut in left main landing gear and/or the shock strut in right main landing gear are converted to the compression state from the extension state.

If the aircraft has touched down, then at step 1020, it is determined whether the vertical speed rate and vertical acceleration on landing of the aircraft are greater than respective thresholds. Meanwhile, at step 1030, the following data is collected: landing data at the time of 1 second before touchdown, landing data at the time of touchdown and landing data from 1 second before touchdown to the time of 3 seconds after touchdown. At step 1040, if any one of the vertical speed rate and vertical acceleration speed is greater than respective thresholds, all of the collected landing data is formatted and then the landing message is generated; otherwise, the landing message is not generated.

Figure 11:
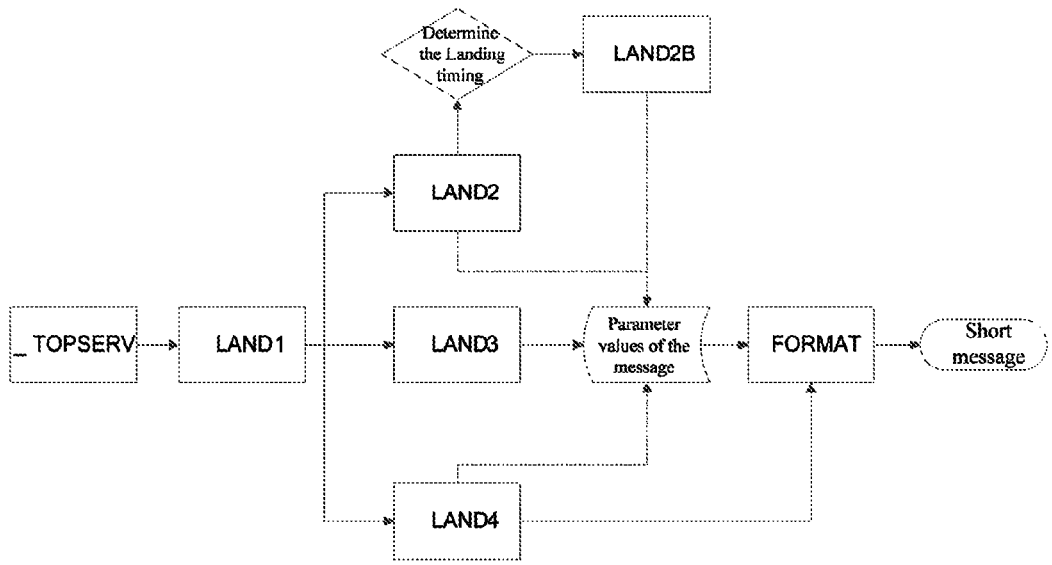
FIG. 11 is a schematic illustrating relationship between triggers for generating a short landing message in the ACMS according to one embodiment of the present invention.

FIG. 11 is a schematic illustrating relationship of triggers in the ACMS for generating short landing messages according to one embodiment of the present invention. The triggers shown in FIG. 11 can be used in the method shown in FIG. 9. As shown in FIG. 11, in the DMU, the top service TOPSERV is a trigger reserved by the system, which corresponds to a main thread of a processor or a base service of an operating system. All of other triggers are started or activated by the TOPSERV. Just before the aircraft is going to land, in the FINAL APPR stage where slat release is more than 5° and the flight altitude is less than 10000 feet, the TOPSERV in the DMU activates the trigger LAND1 for monitoring whether the aircraft touches down.

When the LAND1 detects the compression of any one of the left or right main landing gear, that is, the change of state of the PSEU (proximity switch electric unit), "the aircraft touch down" is marked. Meanwhile, the LAND1 activates triggers LAND2 or LAND2B, LAND3 and LAND4, wherein, both of LAND2 and LAND2B are used to determine whether the RALR (vertical speed rate) and VRTA (vertical acceleration) are greater than respective threshold values. The LAND3 and LAND4 activated by LAND1 record the landing data.

After the LAND4 is finished, all of parameters in the short message have been collected, and then the formats of parameters are converted so as to facilitate reading and printing and finally the landing message is generated.

According to one embodiment of the present invention, during the process of determining the landing of the aircraft by the LAND1, the operating LAND1 reads data of the PSEU's state of the shock struts in the left and right main landing gears. The detecting frequency is 32 times/sec to detect whether the state changes in $\frac{1}{32}$ second. If the parameter indicates the positional state changes from 0 to 1, it means any one of shock struts turns into the compression state from the extension state, therefore, it is determined that the aircraft has landed. This time is right the starting point of landing time of the aircraft.

According to one embodiment of the present invention, the LAND2 and LAND2B determine whether the RALR and VRTA when the aircraft touches down are greater than respective threshold values through the following manners. In order to reflect the landing state of the aircraft more accurately, it is needed to determine whether the RALR and VRTA in a period from 0.5 second before landing to 0.5 second after landing are greater than respective threshold values.

In this embodiment, the LAND2 is activated firstly. The LAND1 outputs a landing time value $T_0$, which is an integral number between 0-32. The LAND2 compares $T_0$ with a fine-adjustment parameter CHK which is between 0-5. If $T_0/2-CHK<0$, it means the landing time is too close to the measuring time and thus it is possible that the data change caused by landing has not been reflected in the measured parameters. Therefore, the LAND2B is activated for determining whether the RALR and VRTA in 1 second after landing time are greater than respective threshold values, and the LAND2 is terminated. If $T_0/2-CHK>0$, the LAND2 determines whether the RALR and VRTA at the landing time are greater than respective threshold values. If not, the LAND2 compares $T_0$ with 16 to determine whether $T_0-16>0$. If $T_0-16<0$, in order to reflect the landing state of the aircraft more accurately, the LAND2B is activated to determine whether the RALR and VRTA in 1 second after landing time are greater than respective threshold values, and the LAND2 is terminated. Once any one comparison performed by the LAND2 and LAND2B indicates that the RALR and VRTA at the landing time are greater than respective threshold values, it means that the landing state of the aircraft meets the requirement to generate the landing message.

In this embodiment, it can be accurately determined whether the RALR and VRTA in the period from 0.5 second before to 0.5 second after the touchdown time are greater than respective threshold values through the operation of two triggers in different periods.

According to one embodiment of the present invention, it is determined under a certain condition whether the vertical load, i.e., VRTA, is greater than its threshold value. Only when the RALR is not greater than the threshold value, the trigger will further determine whether the VRTA is greater than its threshold value. If the RALR is greater than its threshold value, determining whether VRTA exceeds its threshold can be skipped, and the short landing message can be generated directly.

According to one embodiment of the present invention, the vertical speed rate RALR can be obtained in the LAND2 and LAND2B using the following method. On the aircraft, the sampling frequency of the RALR is 16 times/sec. In order to reflect the actual RALR more accurately, the measured RALR needs to be corrected, i.e., the measured RALR is corrected based on the vertical speed rate –IVV measured by the ADIRU (Air Data and Inertial Reference Units) according to the pitching, rolling attitude, respective accelerations along three axes and constant.

According to one embodiment of the present invention, the RALR also can be obtained using the following program segment:

According to one embodiment of the present invention, the LAND2 and LAND2B can directly obtain the vertical acceleration from the vertical load obtained by the ACMS.

According to one embodiment of the present invention, LAND3 can realize the following functions:
a. recording the values of RALT, RALR, PTCH, PTCR, ROLL, ROLR and YAW at (corresponding to) the time of 1 second before the landing time;
b. recording the values of RALT, RALR, PTCH, PTCR, ROLL, ROLR and YAW at the landing time.

```
IVV          = IVV actual sample n (current value of vertical speed rate)
IVV1         = IVV previous sample n−1   ( a preceding sample of vertical speed rate )
PTCHACC      = PTCHACC actual sample n   ( current value of pitch acceleration , intermediate
variable )
PTCHACC 1 = PTCHACC previous sample n−1   ( a preceding (n−1) sample of pitch acceleration ,
intermediate variable )
PTCHACC2 = PTCHACC previous sample n−2   ( No.n−2 sample of pitch acceleration , intermediate
variable )
PTCR : pitch speed rate
PTCR1 : a preceding sample of pitch speed rate
PTCHRAW: pitch ( intermediate variable )
PTCHRAW1 : a preceding sample of pitch ( intermediate variable )
VACC : vertical acceleration ( from inertial navigation )
RALT: radio altitude
PTCH: pitch
Constants :
D        geometrical correction factor for ROLR ft/deg (default is 0)
DX       lever arm correction (x-axis) for R/A RALT ft   ( 321 aircraft : 28.8 / 320 aircraft : 18 /
319aircraft : 18.5 / 318 aircraft : 16.8 )
DZ       lever arm correction (z-axis) for R/A RALT ft   ( 321 aircraft : 7.8 / 320 aircraft : 7.1 / 319
aircraft : 7.2 / 318 aircraft : 7.6 )
DXTPIR lever arm correction (x-axis) for PTCH        ft    (321 aircraft : 53.1 / 320 aircraft : 39 / 319
aircraft : 33.8 / 318 aircraft : 29.5 )
FC   filter frequency                      Hz    ( default is "0.3 " )
K1   filter constant                              ( default is "5.2" )
K2   filter constant                              ( default is "25" )
K3   filter constant                              ( default is "5" )
THETA0 average PTCH at touchdown            deg ( 321 aircraft :4.5 / 320 aircraft :6 / 319
aircraft : 2 / 318 aircraft : 6 )
Initialization of parameters:
     PTCHRAW1 = 0.0
     PTCHACC1 = 0.0
     PTCHACC2 = 0.0
     PTCR1    = 0.0
     EN1      = 0.0
     VZN1     = IVV/60.0
     ZN1      = RALT
     PTCHRAW = (PTCR-PTCR1)/T     (T = 1/16)
     PTCHACC=
     PTCHACC1+T*(2*PI*FC)*(PTCHRAW+PTCHRAW1-PTCHACCI-PTCHACC2)/2   (PI =
     3.14159265)
     NZTCOR = VACC*9.81/0.3048-DXTPIR*PTCHACC/57.3*cos(PTCH/57.3)
     HRACOR=RALT+DX*(sin(PTCH/57.3)-sin(THETA0/57.3))-DZ*(cos(PTCH/57.3)-cos(THEA
     TA0/57.3))
     EPSN   = ZN1-HRACOR
     EN     = EN1+T*(K3*EPSN)
     VZN    = VZN1+T*( ZTCOR-EN-*EPSN)
     VZNU   = VZN-D*ABS (ROLR)
     RALR   = VZNU
     ZN = ZN1 + T*(VZN − K1 * EPSN)
```

The above shows the process to calculate a sample of RALR. Other samples can be calculated by iteration after the first sample is obtained. The iteration method is as follows:

```
EN1 = EN
VZN1 = VZN
ZN1 = ZN
PTCHACC2 = PTCHACC1
PTCHACC1 = PTCHACC
PTCHRAW1 = PTCHRAW
PTCR1 = PTCR
```

According to one embodiment of the present invention, the operation time of the LAND4 is 4 seconds for recording the maximum values and minimum values of VRTA, LONA, LATA and RALR in the period from 1 second before the landing time to 3 seconds after the landing time.

Figure 12:
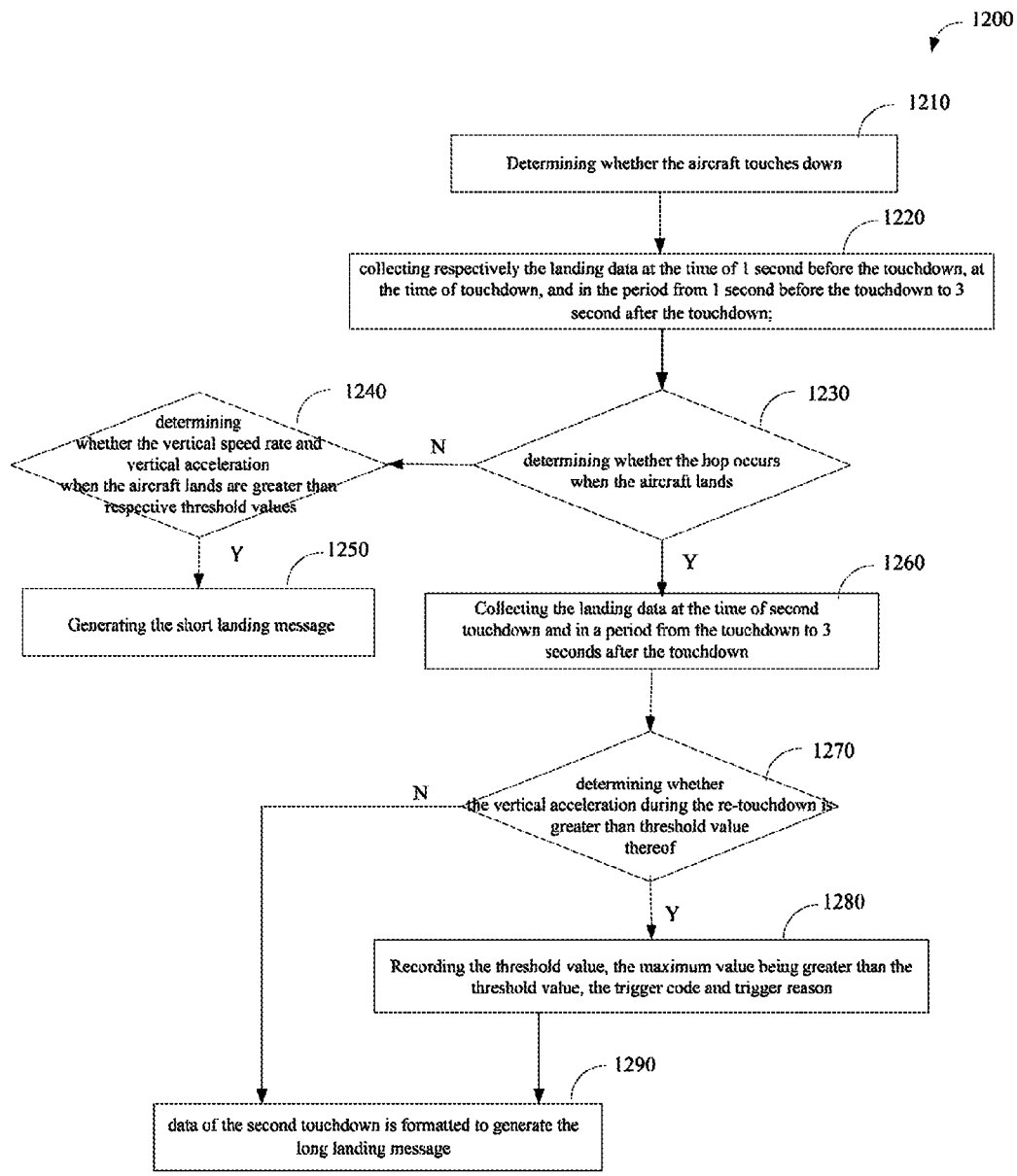
FIG. 12 is a flow chart illustrating a method for generating a landing message using ACMS according to another embodiment of the present invention.

FIG. 12 is a flow chart illustrating a method for generating the landing message using ACMS according to another embodiment of the present invention. The rebound force of the ground when landing may bounce the aircraft, and then the aircraft will hit the ground again. This phenomenon is called "hop" of the aircraft. Such hop when landing may occur once or several times. The hop is very likely to be the hard or heavy landing, therefore, the hop needs to be monitored. The landing message related to the hop when landing is a long landing message, while the ordinary message is a short landing message.

As shown in FIG. 12, the method for generating the long landing message in this embodiment includes: at step 1210, determining whether the aircraft touches down; at step 1220, collecting respectively the landing data at the time of 1 second before the touchdown, at the time of touchdown, and in the period from 1 second before the touchdown to 3 second after the touchdown; at step 1230, determining whether the hop occurs when the aircraft lands. If the hop does not occur, determining whether the vertical speed rate and vertical acceleration when the aircraft lands are greater than respective threshold values at step 1240; if yes, the short landing message is generated at step 1250; if no, the landing message is not generated.

If the hop occurs, the landing data at the time of 1 second before the re-touchdown and 3 second after the re-touchdown is collected respectively at step 1260; meanwhile, determining whether the vertical acceleration during the re-touchdown is greater than threshold value thereof at step 1270; if yes, the threshold value, the maximum value being greater than the threshold value, the trigger code and trigger reason are recorded at step 1280. At step 1290, data of the second touchdown is formatted to generate the long landing message.

According to one embodiment of the present invention, it is determined whether the hop occurs during landing through determining whether two main landing gears have been compressed and kept in the compression state for an enough long period and then whether the left and right main landing gears are in extension state again. It is determined that the aircraft touches down again (re-touchdown, re-landing) through further determining the period is less than 10 seconds in which the left and right main landing gears are in extension state again, and thus it is further determined that the hop occurs.

Figure 13:
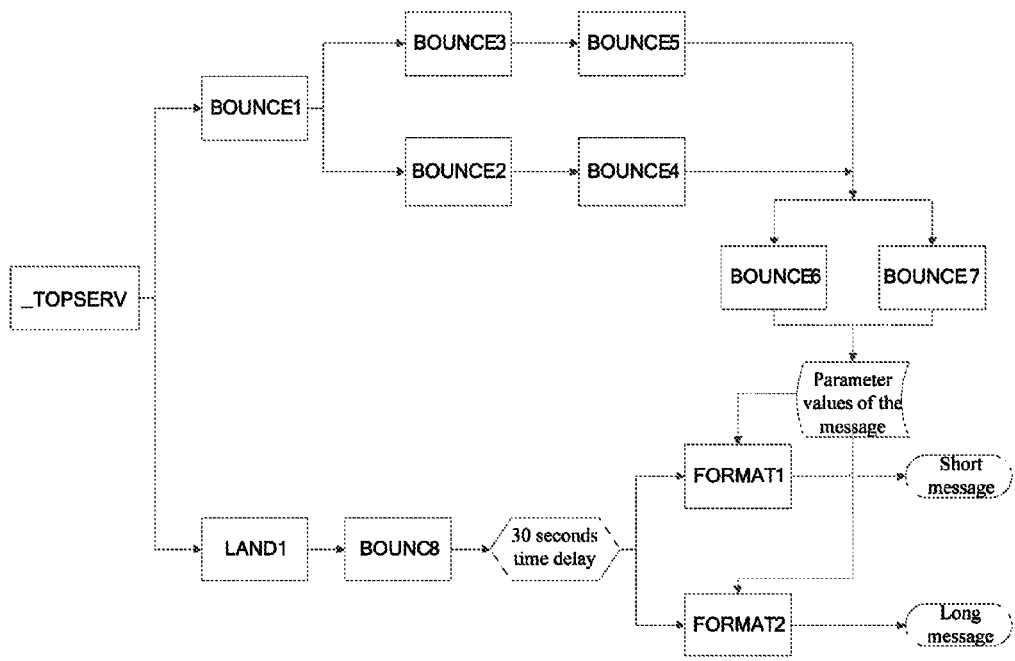
FIG. 13 is a schematic illustrating relationship between triggers for generating a long landing message in the ACMS according to one embodiment of the present invention.

FIG. 13 is a schematic illustrating relationship of triggers for generating long landing messages in the ACMS according to one embodiment of the present invention. The trigger shown in FIG. 13 can be used in the method shown in FIG. 12. As shown in FIG. 13, in the DMU, the TOPSERV is a trigger reserved by the system. Just before the aircraft is going to land, in the FINAL APPR stage where slats release is greater than 5° and the flight altitude is less than 10000 feet, the TOPSERV in the DMU activates the triggers BOUNCE1 and LAND1. The BOUNCE1 is used for monitoring whether the two main landing gears are compressed and kept being compressed for enough long time.

If the BOUNCE1 determines the two main landing gears are compressed and kept compressed for an enough long time, the BOUNCE1 will activate the triggers BOUNCE2 and BOUNCE3, which respectively are used for detecting whether the left and right main landing gears are in the extension state again. And then, the BOUNCE2 and BOUNCE3 activate corresponding triggers BOUNCE4 and BOUNCE5 to further determine the flight state of the aircraft. The BOUNCE4 and BOUNCE5 respectively detect continuously the extension state of the shock struts in the left and right main landing gears, and determine the hop occurs when a certain condition is met.

The BOUNCE4 and BOUNCE5 respectively activate the triggers BOUNCE6 and BOUNCE7 to search, compare and collect the landing data in 1 second before the re-touchdown and in the period from the re-touchdown to 3 seconds thereafter.

The BOUNCE7 also searches and makes a comparison to determine whether the vertical acceleration on the second touchdown is greater than the threshold value thereof. If yes, the threshold value, the maximum value being greater than the threshold value, the trigger code and trigger reason are recorded in the message.

The method for obtaining the landing data used by the BOUNCE6 and BOUNCE7 is similar to that used by the LAND3 and LAND4, and need not be repeated here.

The LAND1 is used to monitor whether the aircraft has touched the ground. If the aircraft has touched the ground, the LAND1 activates the trigger BOUNCE8. The BOUNCE8 determines the long landing message or the short landing message should be generated according to whether or not the hop occurs when the aircraft lands. At last, format conversion is performed on the landing parameters for two landings so that the values in the message are convenient to be read and printed and the corresponding landing message is generated.

According to one embodiment of the present invention, it is determined whether the hop occurs when landing using the following method. The BOUNCE1 read continuously the position state of the PSEU of the shock struts in the left and right main landing gears at the frequency of 32 times/sec, so as to determine whether the position state changes in $\frac{1}{32}$ second. When the position state changes from "0" to "1", the BOUNCE1 starts a counter to accumulate the count. Only when the value of the counter is greater than 16, the BOUNCE1 will activates the BOUNCE2 and BOUNCE3, which means the two main landing gears have been compressed and kept compressed for at least 0.5 second. If the condition is not met, the counter is cleared and accumulates again.

Hereafter, taking the left main landing gear as an example, the right main landing gear can be processed using the same manner.

When the BOUNCE2 operates, it proceeds to detect continuously the position state of the compression PSEU in the left main landing gear at the frequency of 32 times/sec. When the value is "0", the counter start to accumulate count. Only when the value of the counter is greater than 32, the BOUNCE4 will be activated. At present, the shock strut of the left main landing gear is in its extension state, and keeps in that state for more than 1 second. When the condition is not met, the counter is cleared and accumulates count again.

The detection principle of the BOUNCE4 is similar to that of the BOUNCE2. When the value is "0", the counter start to accumulate count. When the value is "1", the accumulated value of the counter is determined. If the accumulated value of the counter is less than 320, it is determined that the hop occurs on the left main landing gear. At present, the period (i.e., time in air), in which the shock strut of the left main landing gear keeps in the extension state, is less than 10 seconds. And then it is in the compression state again.

In a summary, the three conditions of the method for determining whether the hop occurs in this embodiment are the following:
  1. determining whether the left and right main landing gears are in the compression state and keep in that state for more than 0.5 second;
  2. determining whether any one of the left and right main landing gears is in the extension state again and keeps in that state for more than 1 second; and
  3. determining whether any one of the left and right main landing gears is in the extension state again and keeps in that state for less than 10 seconds.

If the above conditions are met, it is determined that the hop occurs during the landing of aircraft.

According to one embodiment of the present invention, after the BOUNCE8 operates for 30 seconds, it is determined according to the values of the BOUNCED, LONGLRPT and BRPTCODE whether the long message or the short message should be generated, wherein, the meanings of the parameters are as follows:

BOUNCED: state parameter indicating that hop occurs, and being set after BOUNCE4 or BOUNCE5 detects the hop;

LONGLRPT: state parameter indicating that long message might be generated, and being set by trigger LAND2/2B when vertical load is over the limit during first touchdown.

BRPTCODE: message trigging code, which is set when the trigger BOUNCE7 detects that the parameters are above their limits during second touchdown.

BOUNCE8 uses the above parameters and determines whether long or short messages shall be generated.

Specifically, please refer to the table below

| BOUNCED | LONGLRPT | BRPTCODE | message type |
|---------|----------|----------|--------------|
| 0 | 1 | NIL | short message |
| 1 | 1 | NIL | long message |
| 1 | 0 | 4500 | long message |

FIG. 14 is an example of the short landing message according to one embodiment of the present invention. As shown, it can be seen from the figure that the vertical speed RALR is only 1.8 ft/sec during this landing. The vertical acceleration VRTA is 1.64 G, which is in the range of normal landing. However, the lateral acceleration is 0.21 G, which may be a slight higher. In this case, even the flight crew reports that the relatively hard landing occurs, it is easy to see that this landing is normal and the hard or heavy landing does not occur according to the short landing message.

FIG. 15 is an example of the long landing message according to one embodiment of the present invention. As shown, it can be seen from the figure that the hop occurs during this landing. In the process of the first touchdown, the RALR is 7.2 ft/sec and the VRTA is 2.07G. The RALR is in the normal range, and the VRTA also is below the threshold value thereof. In the process of the second touchdown, the RALR is 1.5 ft/sec and the VRTA is 2.65G. Therefore, the hop occurs during landing, and vertical load during second touchdown exceeds its limit.

The flight crew can obtain the landing message from a nonvolatile memory of the DMU and also can print the landing message in the cockpit, or the performance monitoring staff can read the landing message downloaded from an air-ground data link system through a ground station to realize the monitoring of the landing performance of the aircraft, so as to ensure the abnormal condition can be found timely and accurately. In such manner, a lot of data processing and checking, which are used to determine whether the aircraft has a hard or heavy landing, can be avoided, and thus the down time of the aircraft can be saved and the utilization of the aircraft can be improved; meanwhile, the aircraft can avoid to operate with security risks and the security risks can be eliminated. The recorded data further help the flight quality monitoring department to estimate operation technique quality of the flight crew.

The ACMS of Airbus is taken as an example in the present invention, but the application of the present invention is not limited thereto. The present invention also can use the AHM of Boeing and thus can be applied to the aircrafts of Boeing.

The above embodiments of the invention have been disclosed for illustrative purposes and the invention is not to be limited to the particular forms or methods disclosed. Those skilled in the art will appreciate that various modifications, additions and substitutions are possible. Therefore, the invention is to cover all modifications, equivalents and alternatives falling within the scope of the appended claims.

The invention claimed is:

1. A method for detecting performance of an aircraft based on a customized message, comprising:
    collecting data reflecting operation status of the aircraft;
    generating the customized message based on the collected data, wherein, the customized message includes one or more main parameters related to the operation status of the aircraft and one or more auxiliary parameters related to correction of the main parameters, wherein said generating further comprises obtaining values of the main parameters and the auxiliary parameters at one or more timings in response to a trigger condition;
    storing or transmitting the customized message;
    detecting the performance of the aircraft based on the customized message;
    starting a first process which is used to monitor whether the trigger condition is met;
    starting a second process which is used to monitor whether a condition of generating the customized message is met; and
    starting a third process which is used to collect the values of the main parameters and the auxiliary parameters required by the customized message;
    wherein, the customized message is generated using the values of the main parameters and auxiliary parameters collected in the third process, when the second process determines that the condition of generating the customized message is met; and wherein the second process and the third process are started by the first process.

2. A method according to claim 1, further comprising:
    converting the values of the main parameters and the auxiliary parameters into values under a specified condition.

3. A method according to claim 2, further comprising:
    correcting the values of the main parameters according to the values of the auxiliary parameters.

4. A method according to claim 1, wherein, the main parameters of the customized message are determined by the following steps:
    obtaining multiple parameters related to the operation status of the aircraft;
    determining multiple main parameters according to respective physical implications indicated by the multiple parameters;
    calculating correlations between the multiple main parameters; and
    removing one or more of the multiple main parameters based on the correlations between the multiple main parameters.

5. A method according to claim 1, wherein, the main parameters of the customized message is determined by the following steps:
    obtaining multiple parameters related to the operation status of the aircraft;
    associating the multiple parameters with failure events of the aircraft to determine the multiple main parameters;
    calculating correlations between the multiple main parameters; and
    removing one or more of the multiple main parameters based on the correlations between the multiple main parameters.

6. A method according to claim 5, wherein, the step of associating comprising:
    calculating correlations between the multiple parameters and the failure events of the aircraft through data mining.

7. A method according to claim 1, wherein, the first process is configured to determine whether the aircraft is in a takeoff stage, climbing stage or descending stage;
the second process is configured to determine whether an outlet temperature of precoolers of left and right engines is higher than 220° C. or lower than 155° C. and maintains for more than 5 seconds;
the third process collects the outlet temperature of the precoolers of the left and right engines at every second.

8. A method according to claim 7, further comprising:
generating a customized bleed air message,
wherein, main parameters of the customized bleed air message include a period in which the outlet temperature of precoolers of the left and right engines is higher than 220° C. or lower than 155° C., and a maximum value or a minimum value of the outlet temperature of the precoolers of the left and right engines; and
auxiliary parameters of the customized bleed air message include an altitude of the aircraft and an ambient temperature.

9. A method according to claim 1, wherein, the customized message is a customized message other than a system message.

10. A method according to claim 1, wherein, the customized message is generated using the ACMS of Airbus or the AHM of Boeing.

11. A method according to claim 1, wherein, the step of storing and transmitting comprising:
storing the customized message in a nonvolatile storage memory of an aircraft data system or transmitting the customized message by the ACARS or ATN.

12. A method according to claim 1, wherein, a trigger condition of the customized message or a condition to generate the message is changeable.

13. A method according to claim 12, wherein, the trigger condition of the customized message is configured to generate the customized message at each flight.

14. A method according to claim 13, wherein, the step of detecting comprising:
collecting the customized messages of multiple flights; and
detecting the performance of the aircraft based on an actual physical model, a feature evolution model or an intelligent model through using the customized messages of multiple flights.

15. A method for maintaining an aircraft, comprising:
detecting performance of the aircraft using the method in claim 1; and
maintaining the aircraft in response to a failure of the aircraft; or
arranging the aircraft to be maintained in an appropriate time in response to a decline of the performance of the aircraft.

* * * * *